United States Patent
Wang et al.

(10) Patent No.: US 8,291,206 B2
(45) Date of Patent: Oct. 16, 2012

(54) METHOD FOR BOOTING COMPUTER SYSTEM

(75) Inventors: Hsien-Shan Wang, Taipei (TW); Tsung-Fu Hung, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 360 days.

(21) Appl. No.: 12/490,320

(22) Filed: Jun. 24, 2009

(65) Prior Publication Data
US 2010/0005286 A1    Jan. 7, 2010

(30) Foreign Application Priority Data
Jul. 3, 2008    (TW) ................ 97125130 A

(51) Int. Cl.
G06F 9/445    (2006.01)
G06F 15/177   (2006.01)
G06F 9/24     (2006.01)
G06F 9/22     (2006.01)

(52) U.S. Cl. ............ 713/1; 713/2; 713/100; 711/170; 717/174

(58) Field of Classification Search ............ 713/1, 2, 713/100; 711/162, 170; 717/174; 714/174
See application file for complete search history.

(56) References Cited

U.S. PATENT DOCUMENTS

| 5,131,089 A | 7/1992 | Cole |
| 5,692,190 A | 11/1997 | Williams |
| 6,516,410 B1* | 2/2003 | Heller .......................... 713/2 |
| 7,318,149 B2* | 1/2008 | Cepulis et al. ............... 713/2 |
| 2004/0088532 A1 | 5/2004 | Chuang |
| 2004/0107310 A1* | 6/2004 | Lin ............................ 711/106 |
| 2008/0133902 A1* | 6/2008 | Love ........................... 713/2 |

FOREIGN PATENT DOCUMENTS

| CN | 1504880 A | 6/2004 |
| TW | I224728 | 12/2004 |

OTHER PUBLICATIONS

"First Office Action of China Counterpart Application", issued on Jul. 25, 2011, p. 1-p. 4, in which the listed reference was cited.

* cited by examiner

*Primary Examiner* — Fahmida Rahman
(74) *Attorney, Agent, or Firm* — Jianq Chyun IP Office

(57) ABSTRACT

A method for booting a computer system is provided. In the method for booting the computer system, a memory space is created using a BIOS to simulate a virtual disk. The virtual disk is used to execute operations which have to be executed via a floppy disk drive. The operations are executed in the virtual disk via the BIOS. In addition, a second virtual disk is created for storing program files needed in installing the operating system.

7 Claims, 3 Drawing Sheets

METHOD FOR BOOTING COMPUTER SYSTEM

CROSS-REFERENCE TO RELATED APPLICATION

This application claims the priority benefit of Taiwan application serial no. 97125130, filed on Jul. 3, 2008. The entirety of the above-mentioned patent application is hereby incorporated by reference herein and made a part of specification.

BACKGROUND OF THE INVENTION

1. Field of the Invention

The invention relates to a method for booting a computer system and, more particularly, to a method for booting a computer system after a floppy disk drive is removed.

2. Description of the Related Art

With the progress of computer science and technology, electronic data size is larger and larger, and storage media vary therewith. A floppy disk cannot satisfy the storage of mass data. The advent of a universal serial bus (USB) device makes a user no longer use a floppy disk to store data, and this is mainly because the floppy disk has low capacity and low stableness, and data is always unable to be retrieved. Therefore, the floppy disk drive is not expected by the user when he or she buys a personal computer.

FIG. 1 is a flow chart showing a conventional method for booting a computer system. As shown in FIG. 1, it is a booting procedure of the computer while an operating system is installed. First, a power supply is turned on (step 101), and then a power on self test (POST) is executed (step 102). Since there are a plurality of devices in the computer system, whether elements in the system are normal is checked first when the computer is booted. Then, the operating system is loaded from a compact disk (CD) (step 103). When the operating system is installed, sometimes it is necessary to install drivers of some hardware devices first and then install the operating system when the hardware devices are detected. Then, whether the driver needs to be retrieved from the floppy disk drive A is determined (step 104). In addition, the floppy disk having the driver is prepared first (step 105) to install the driver from the floppy disk drive A. If it is determined that the driver needs be retrieved from the floppy disk drive A, the prepared floppy disk is disposed in the floppy disk drive. The driver is retrieved from the floppy disk drive A (step 106) to be installed. After the driver is installed, a virtual hard disk is created to store files needed in installing programs (step 107). The installed file is copied to the virtual hard disk from the compact disk, and then it is installed. If it is determined that the driver does not need to be retrieved from the floppy disk drive A in step 104, step 107 is performed directly to create a virtual hard disk. After step 107 is performed, the operating system is continued to be installed (step 108). At last, the booting procedure is finished (step 109).

From the conventional technique, the floppy disk drive is needed under certain conditions. When programs of the operating system are installed, the driver needs to be retrieved from the floppy disk drive. To install the operating system, the user has to buy a floppy disk drive additionally. In addition, the user has to keep the floppy disk or copy the driver, which make the user feel troublesome.

BRIEF SUMMARY OF THE INVENTION

One objective of the invention is to provide a method for booting a computer system. In the method, a floppy disk drive is replaced by a virtual disk created using a BIOS.

To achieve the above or other objectives, the invention provides a method for booting a computer system. First, a power supply is turned on, and then a power on self test (POST) is executed. During the POST, the BIOS creates a memory space to simulate a virtual disk. After the POST is finished, an operating system is loaded, and the booting procedure is finished.

According to the method for booting the computer system in an embodiment of the invention, the memory space is part of the memory space of the main memory in the computer system. The main memory may be a random access memory (RAM), and the scope is not limited.

According to the method for booting the computer system in an embodiment of the invention, the method further includes checking whether object data is in a BIOS read only memory (ROM). If the object data is in the BIOS ROM, the object data is copied to the virtual disk, and the object data may be a driver.

According to the method for booting the computer system in an embodiment of the invention, the method further includes checking whether the object data is in a compact disk (CD). If the object data is in the compact disk, the object data is copied to the virtual disk, and the object data is a driver.

In the invention, a memory space is created using the BIOS and used to simulate the virtual disk. Operations are performed on the virtual disk via the BIOS. Thus, former operations may be performed normally when the floppy disk drive is removed.

These and other features, aspects and advantages of the present invention will become better understood with regard to the following description, appended claims, and accompanying drawings.

DETAILED DESCRIPTION OF THE EMBODIMENTS

When some programs are installed, files have to be retrieved via a disk drive A (a floppy disk drive). However, a user does not expect the floppy disk drive to be used gradually. In the invention, a memory space is created using the BIOS to simulate a virtual disk to replace the real floppy disk drive. These and other features, aspects and advantages of the present invention will become better understood with regard to the following description, appended claims, and accompanying drawings.

Figure 1:
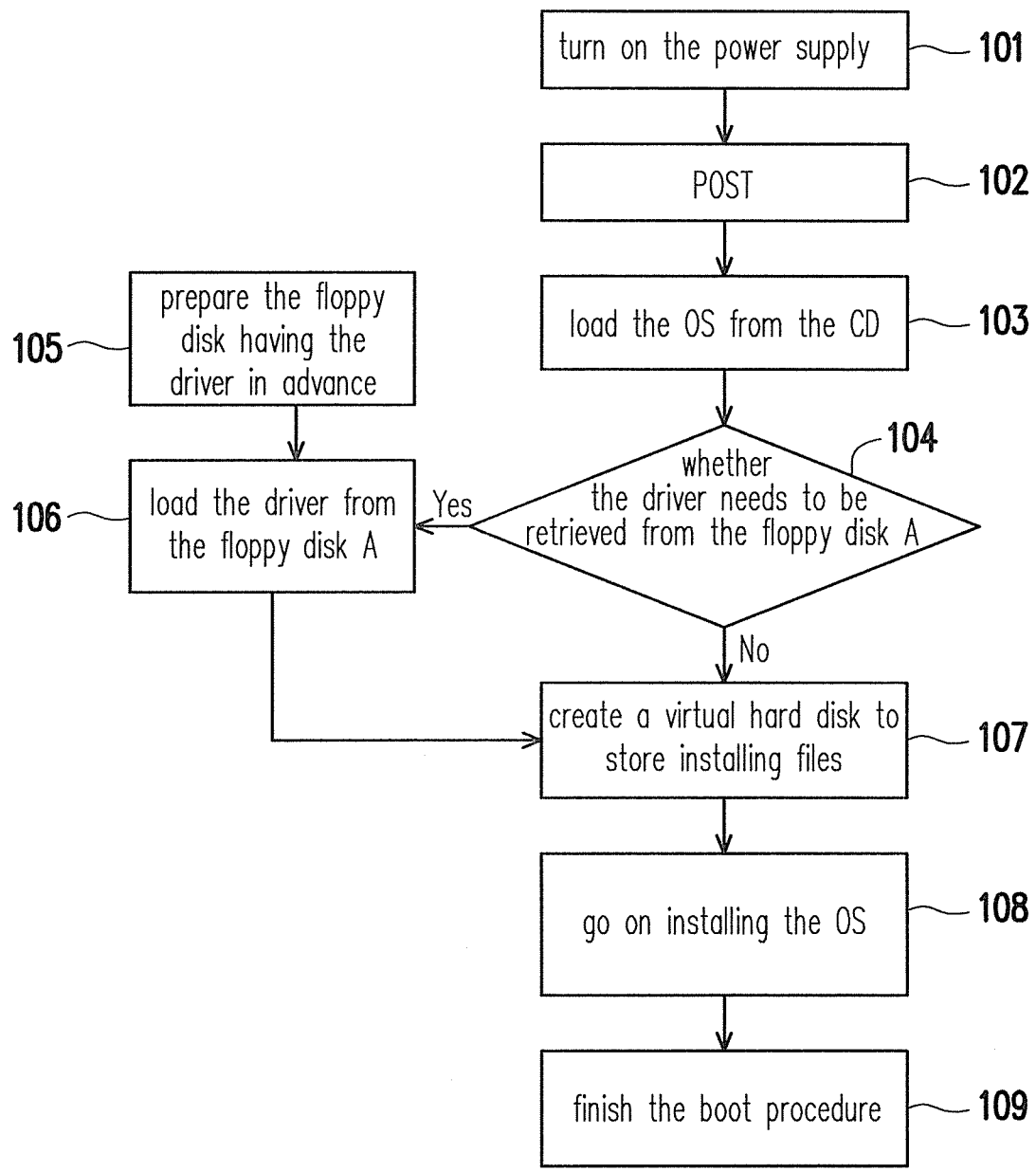
FIG. 1 is a flow chart showing a conventional method for booting a computer system.
Figure 2:
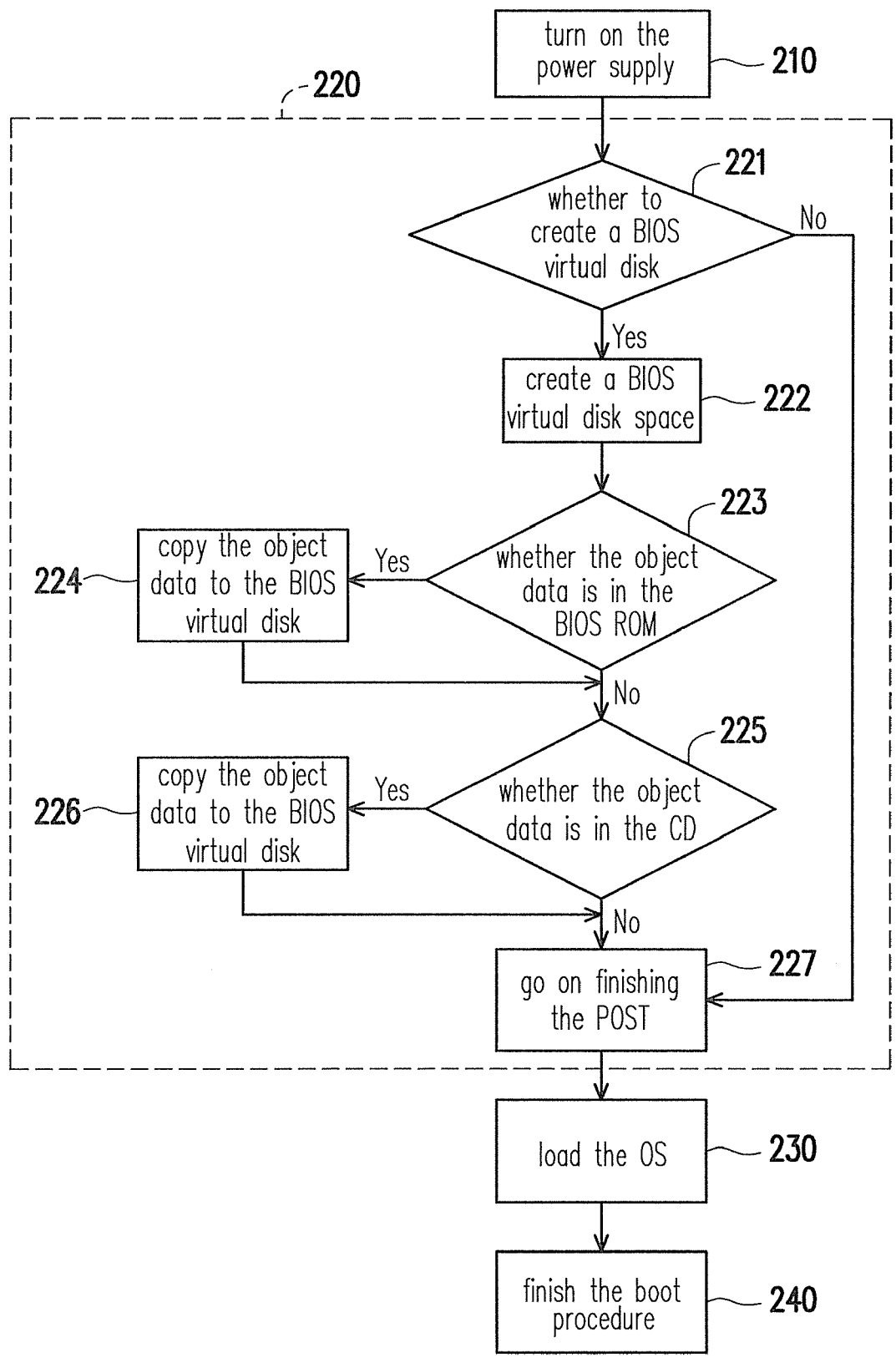
FIG. 2 is a flow chart showing the method for booting the computer system in an embodiment of the invention.

FIG. 2 is a flow chart showing a method for booting a computer system in an embodiment of the invention. As shown in FIG. 2, the embodiment shows a booting procedure while an operating system is installed. First, a power supply is turned on (step 210). Then, the computer system executes the POST (step 220). During the POST, the BIOS detects the configuration of elements in the system such as whether a hard disk can be detected.

In performing step 220, step 221 is performed to determine whether a virtual disk (named BIOS virtual disk hereinbelow) is created by the BIOS. The user may set parameters of the BIOS to determine whether the BIOS virtual disk needs to be created. For example, the user may set whether to enable the option "BIOS virtual disk" in the BIOS. If drivers of some hardware should be installed before the operating system is installed, the operating system is installed after the hardware devices are detected. However, since the computer has no floppy disk drive, the user has to set the option "BIOS virtual disk" in the BIOS to be "enable" in advance to create the disk drive A (the BIOS virtual disk herein) before the operating system is loaded. In step 222, a memory space is created by the BIOS to simulate a virtual disk (the BIOS virtual disk). In the embodiment, the BIOS virtual disk is used to replace the conventional real floppy disk drive. In addition, the memory space may be space of any memory in the computer, such as the real hard disk or the main memory. The main memory may be a RAM, and both of them are not limited thereto. In the embodiment, a RAM is taken as an example of the memory space.

When it is determined that the BIOS virtual disk should be created in step 221, the space of the BIOS virtual disk is created in the RAM (step 222). The disk space may be 1.44 MB or larger, such as 20 MB or 30 MB. It varies according to different conditions. Then, step 223 is performed to check whether object data is in the BIOS ROM. In the embodiment, the object data may be a driver, and it also may be one of other programs, files and/or data. If the object data is in the BIOS ROM, step 224 is performed to copy the object data to the BIOS virtual disk. On the contrary, if the object data is not in the BIOS ROM, whether the object data is in the compact disk is checked (step 225). Since the memory space of the BIOS ROM is limited, manufacturers also may store the object data in the compact disk.

In step 225, if it is determined that the object data is in the compact disk, the object data is copied to the BIOS virtual disk (step 226). Then, other procedures of the POST are continued to be executed (step 227). If the object data is not in the compact disk, step 227 is performed directly to go on executing other procedures of the POST.

For example, when the manufacturers manufacture a motherboard, the driver needed to be used may be stored in the memory space of the BIOS such as the ROM or a flash memory in advance, or the driver may be disposed in the compact disk having larger capacity. During the installing process, if the driver should be installed first, whether there is a proper driver in the BIOS ROM may be checked first. If there is, the driver is copied to the BIOS virtual disk to install the operating system. If there is not, whether there is the proper driver in the compact disk is checked, and then the driver is copied to the BIOS virtual disk to install the operating system. After the BIOS virtual disk and the driver are prepared, step 227 is performed to execute other procedures in the POST.

In addition, when it is determined that the BIOS virtual disk does not need to be created in step 221, step 227 is performed directly to go on executing other procedures of the POST. Thus, the user may choose not to create the BIOS virtual disk to save the memory space. That is, when no driver needs to be installed before the operating system is installed, the POST may be finished directly without installing the BIOS virtual disk.

Figure 3:
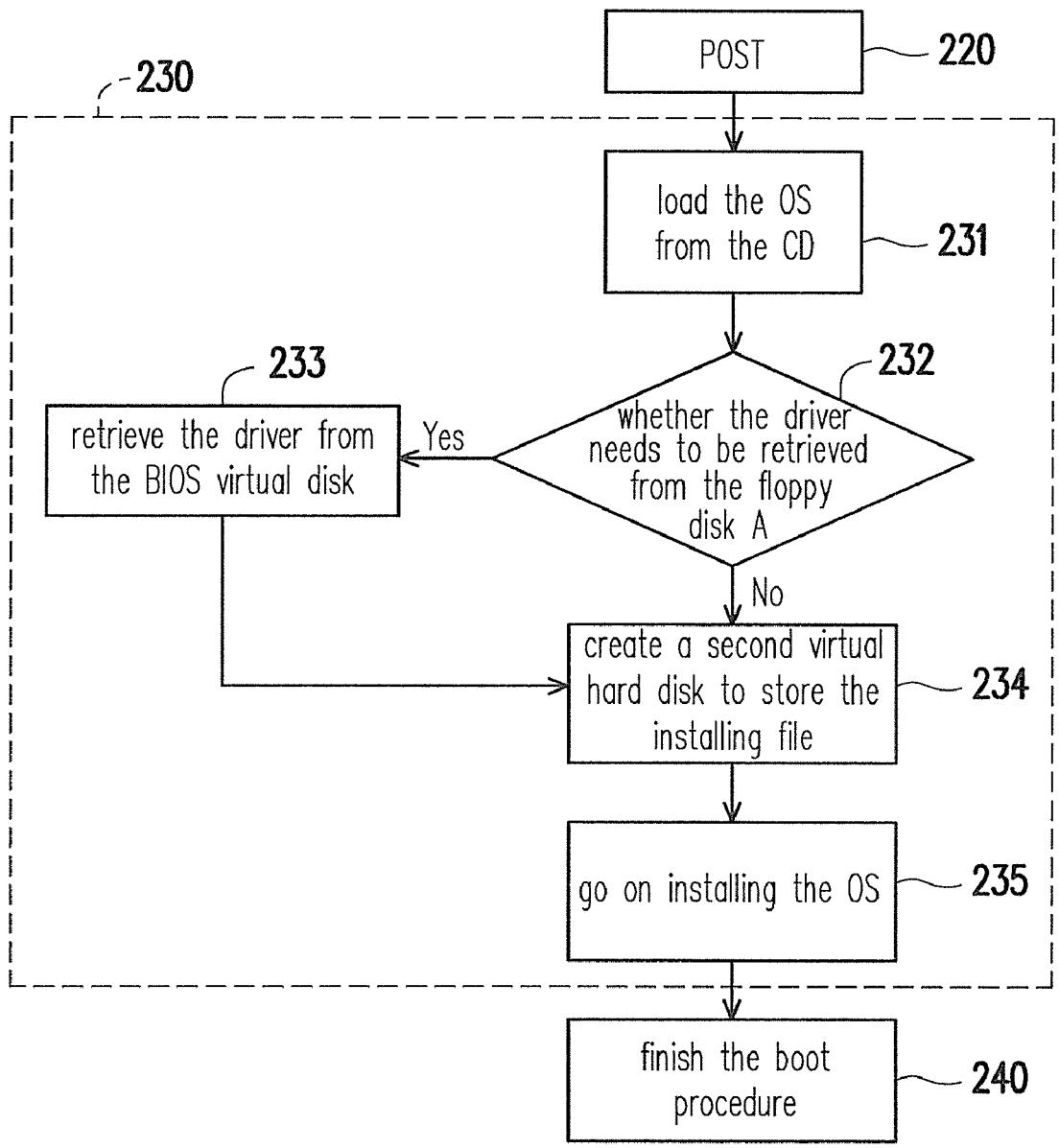
FIG. 3 is a flow chart showing the method for loading the operating system in an embodiment of the invention.

After the POST is finished, the operating system is loaded (step 230). FIG. 3 is a flow chart showing the method for loading the operating system in an embodiment of the invention. As shown in FIG. 3, the operating system is loaded from the compact disk in step 231 first, and then it is determined whether the driver needs to be retrieved from the floppy disk drive A in step 232. If the driver needs to be retrieved from the floppy disk drive A, the driver is retrieved from the virtual disk created by the BIOS (step 233). Then, the corresponding hardware of the computer system is driven according to the driver. In step 234, a second virtual disk is created, and the second virtual disk is different from the BIOS virtual disk created in step 222. In step 222, the BIOS virtual disk is used to replace the conventional real floppy disk drive. In step 234, the second virtual disk is created after the POST is finished, and the BIOS cannot use the second virtual disk as the floppy disk drive. In the embodiment, the second virtual disk may be a virtual hard disk for storing program files needed in installing the operating system. At last, other installing programs of the operating system are finished (step 235) to boot the computer (step 240).

The floppy disk drive in the operating system is set to be the disk drive A all along, and some data is set to be retrieved via the disk drive A, which is still used now. Therefore, a BIOS virtual disk is created to make the system operated fluently. If it is determined that the data should be read from the floppy disk drive A, the system retrieves data from the BIOS virtual disk.

To sum up, the method for booting the computer system in the invention has advantages as follows.

First, object data is stored using a virtual disk, and thus, the conventional floppy disk drive may be removed, and the cost is reduced.

Second, the driver is installed via the virtual disk to reduce the time consumed in reading data from the floppy disk and increase the installing speed.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for booting a computer system, comprising:
   switching on a power supply;
   creating a memory space by a basic input/output system (BIOS) to simulate a first virtual disk;
   checking whether an object data is stored in a BIOS read only memory (ROM);
   copying the object data to the first virtual disk if the object data is stored in the BIOS ROM;
   checking whether the object data is stored in a peripheral device;
   copying the object data from the peripheral device to the first virtual disk if the object data is stored in the peripheral device and the object data stored in the peripheral device is different from the object data stored in the BIOS ROM;
   executing the object data stored in the first virtual disk; and
   loading an operating system (OS), wherein the step of loading the operating system comprises:
   loading the operating system from a compact disk;
   retrieving the object data from the first virtual disk;
   driving a hardware of the computer system according to the object data;
   installing the operating system;
   creating a second virtual disk; and
   copying a plurality of program files needed in installing the operating system to the second virtual disk.

2. The method for booting the computer system according to claim 1, wherein the memory space is part of a memory space of a main memory in the computer system.

3. The method for booting the computer system according to claim 2, wherein the main memory is a random access memory (RAM).

4. The method for booting the computer system according to claim 1, wherein the object data copied to the first virtual disk is a driver.

5. The method for booting the computer system according to claim 1, further comprising:
   checking whether the object data is in the compact disk (CD); and
   copying the object data to the first virtual disk if the object data is in the compact disk.

6. The method for booting the computer system according to claim 5, wherein the object data copied to the first virtual disk is a driver.

7. The method for booting the computer system according to claim 1, further comprising:
   setting whether the first virtual disk is enabled in the BIOS.

* * * * *